Nov. 14, 1961 R. L. RUSE ET AL 3,008,303
VEHICLE AIR CONDITIONING DEVICE
Filed April 11, 1960 2 Sheets-Sheet 1
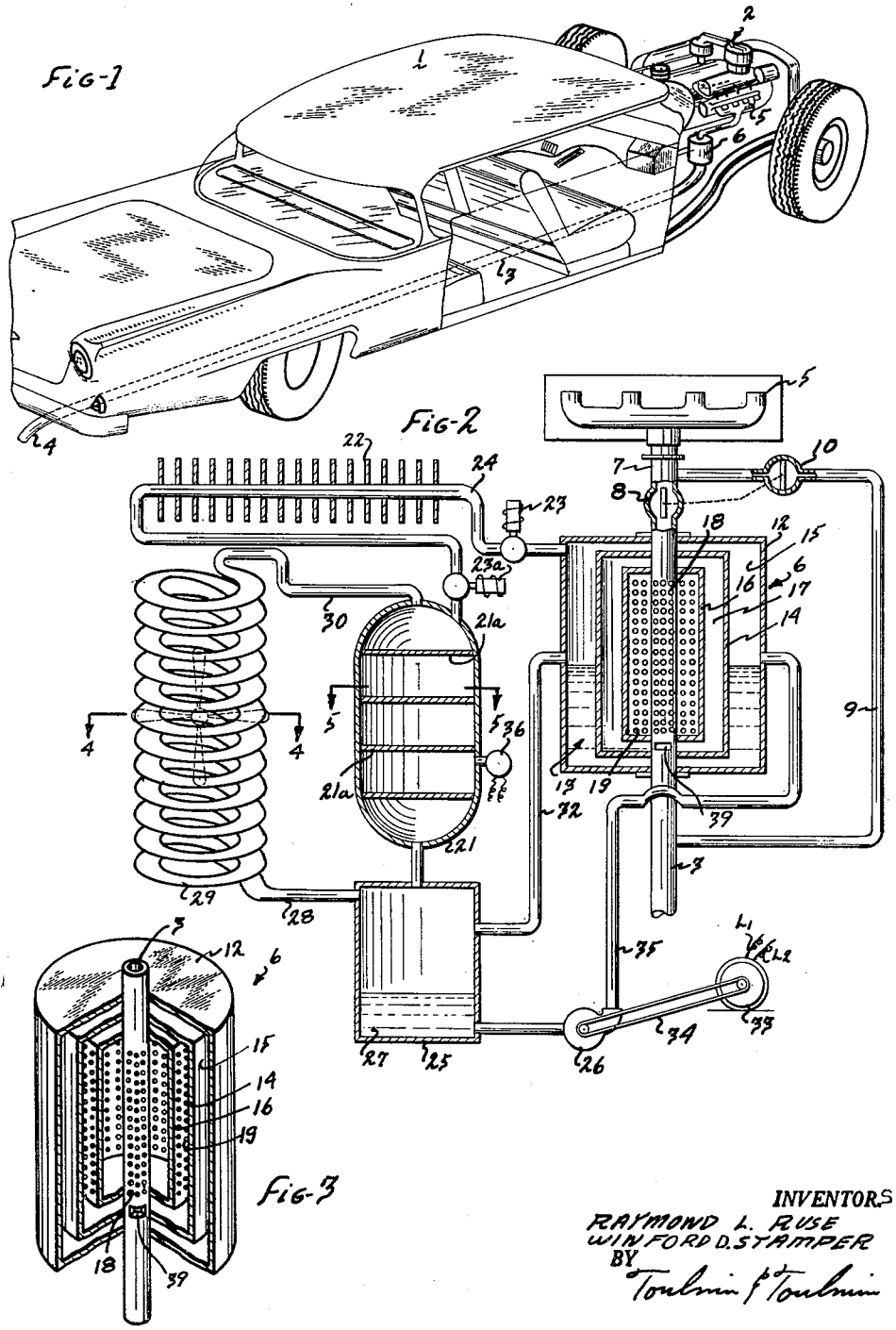
INVENTORS
RAYMOND L. RUSE
WINFORD D. STAMPER
BY
Toulmin & Toulmin
ATTORNEYS Nov. 14, 1961  R. L. RUSE ET AL  3,008,303
VEHICLE AIR CONDITIONING DEVICE
Filed April 11, 1960 2 Sheets-Sheet 2
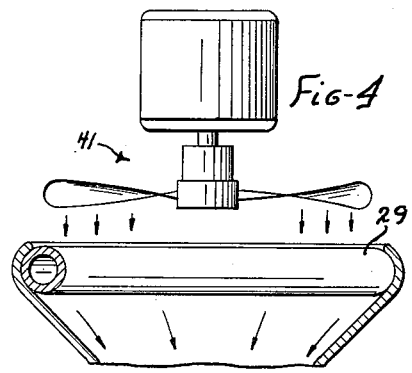
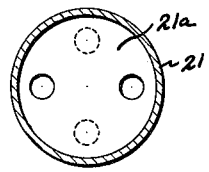
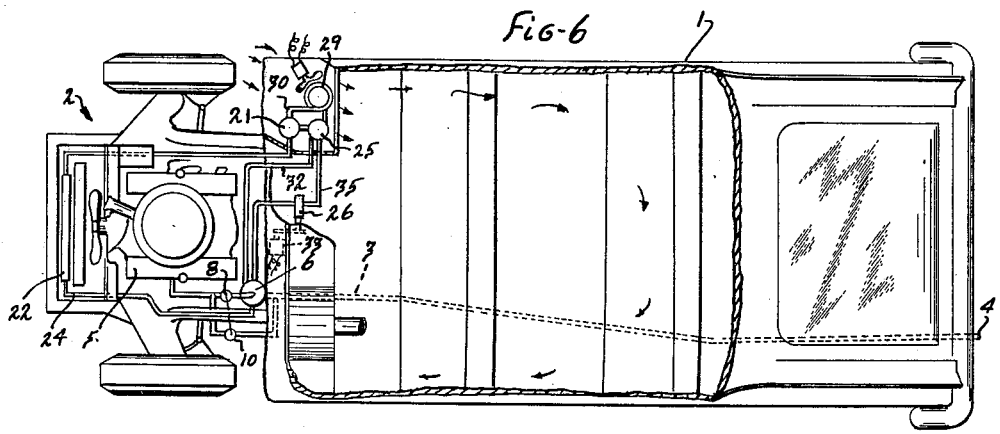
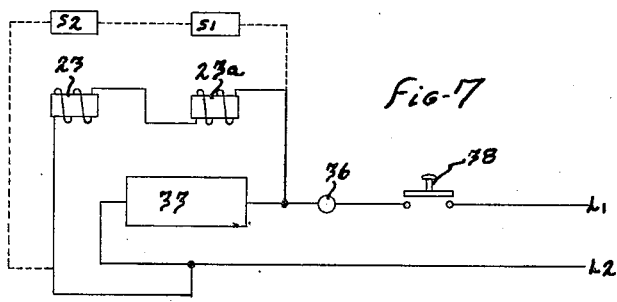
INVENTOR.
RAYMOND L. RUSE
WINFORD D. TAMPER
BY
Toulmin & Toulmin
ATTORNEYS

United States Patent Office 3,008,303
Patented Nov. 14, 1961

3,008,303
VEHICLE AIR CONDITIONING DEVICE
Raymond L. Ruse and Winford D. Stamper, Dayton, Ohio, assignors to The Commonwealth Engineering Company of Ohio, Dayton, Ohio, a corporation of Ohio
Filed Apr. 11, 1960, Ser. No. 21,541
1 Claim. (Cl. 62—238)

This invention relates to a cooling system for an engine driven vehicle wherein heat developed in engine operation, and normally wasted, is employed as a source of energy for the airconditioning system.

Specifically, the invention in its preferred embodiment contemplates the utilization of the heat of the exhaust gases as a source of energy, such utilization causing no deleterious effect on engine operation while at the same time being readily controllable and affording a simplified structural arrangement.

The invention further contemplates the provision in an engine driven vehicle of a novel generator for the refrigerating liquid of an air-conditioning system of the vehicle.

These and other objects will become more apparent by reference to the following detailed description and accompanying drawings wherein:

FIGURE 1 is a perspective view of a vehicle having the structure of the invention incorporated therein;

FIGURE 2 is a schematic view illustrating the arrangement of the components of an air-conditioning unit incorporating the invention;

FIGURE 3 is a perspective view partially in section of a generator in accordance with the structures of FIGURES 1 and 2;

FIGURE 4 is a fragmentary, more or less diagrammatic view showing a fan for blowing air through the cooling coil of FIG. 2;

FIGURE 5 is a view taken on line 5—5 of FIGURE 2;

FIGURE 6 illustrates an arrangement of the components; and

FIGURE 7 is a schematic diagram of an electrical circuit useful in connection with the invention.

Referring to the drawings the numeral 1 in FIGURE 1 designates an automotive vehicle powered by a gasoline engine 2 having an exhaust line 3.

Provided in the exhaust line 3 between the rearward extremity 4 of the exhaust line and the manifold 5 of engine 2 is a gas generator 6 more clearly shown in FIGURE 2. Gas generator 6 has an inlet line 7 through a valve 8 controlled in any suitable manner as by a lever (not shown). Also between manifold 5 and the rearward extremity 4 is a by-pass line 9 having a valve 10—preferably controlled simultaneously with the valve 8—this relation being indicated by the dotted line connecting the valves.

Gas generator 6 comprises an outer imperforate casing 12 containing the refrigerant in solution—suitably ammonia in water—designated at 13. Concentric with casing 12 is a second imperforate housing 14 defining chamber 15 with the casing 12 and separating casing 12 from a perforated shell 16, a spacing 17 being defined between shell 16 and housing 14.

The exhaust line 3 may itself form a portion of the generator as illustrated (FIGURE 2) and may be perforated or the perforated line may itself be connected into the generator structure and secured to the exhaust line by suitable standard fittings.

Shell 16 is concentric with the exhaust line 3 which passes through and is perforated to form a portion of the generator, the exhaust line perforations being designated at 18 and those of the shell at 19. Thus the exhaust line interior is communicable with the spacing through the perforations 18 and 19 and exhaust gases may be thereby passed to spacing 17. Suitably casing 12 is of metal and insulated against heat loss as by insulation 12a, while housing 14 is heat transmissive and suitably of rust-resistant metal such as stainless steel; stainless steel also is desirable in shell 16.

Generator 6 is adapted to be positioned vertically (FIGURE 1), and the exhaust line portions are readily configurated to accomplish this.

Referring now to FIGURE 2 more specifically, the numeral 21 designates an evaporator between which and the generator 6 a condenser 22 and normally closed solenoid valves 23, 23a are positioned in conduit 24. Evaporator 21 has perforated plates 21a and also communicates with generator 6 through an absorption chamber 25 and pump 26. Absorption chamber 25 is vertically disposed below the evaporator in such manner that liquid absorption material 27—suitably water—will not cover the outlet conduit 28 which communicates with cooling coil 29.

Coil 29 together with conduits 28 and 30 and the evaporator 21 form a closed path for the circulation of a gas such as hydrogen. It is particularly important that this gas be substantially not absorbed by the liquid 27 while the refrigerant gas is so absorbed.

The generator 6 is itself in direct communication with absorption chamber 25 through line 32 to provide for any overflow of liquid from the generator. Suitably absorption chamber 25 is large enough to accommodate all of the liquid of the system.

Pump 26 is driven by electric motor 33 through belt 34 to provide for the passage of liquid material 27 to the generator 6 through piping 35. Motor 33 is controlled through a thermostat 36 on the evaporator 21, power being supplied through conductors $L_1$, $L_2$ from the vehicle battery.

The coil 29, absorber 25 and condenser 22 are all preferably air cooled and for this purpose are positioned closely adjacent an inlet air stream to the vehicle; in addition air cooled by the evaporator 21 may be directed to these components.

For operation of the device a good pressure of hydrogen gas is provided in the coil, absorption chamber, evaporator system. Additionally a supply of liquid ammonia is provided between solenoid valves 23, 23a in condenser 22. Above the liquid 13 in chamber 15 a supply of ammonia vapor normally exists.

To utilize the system button switch 38 (FIGURE 7) is closed to provide the solenoids 23, 23a in circuit and to thereby open the valves. Valves 8, 10 are brought to the position of FIGURE 2 manually or if desired may be interlocked with button switch 38 for the same purpose.

With the opening of solenoid valves 23, 23a liquid ammonia trickles downwardly into the evaporator, vaporizes and begins to cool the evaporator and hydrogen gas in the evaporator. The pressure in the evaporator is primarily due to the hydrogen, the partial pressure of the ammonia being lower. The cooled hydrogen moves downwardly in the evaporator with the ammonia gas to the absorption chamber. The absorption chamber picks up in the liquid material thereof the ammonia while permitting the hydrogen to pass to conduit 28. Since the absorption chamber in its function tends to become heated the hydrogen picks up heat and rises to coil 29 where in its passage through the coil it is cooled somewhat for its return to the upper end of the evaporator.

The ammonia absorbed by the liquid 27 passes through pump 26 for return as a solution to the generator 6.

Generator 6 meanwhile is heated by the engine exhaust flowing therethrough and out the venturi 39 of the exhaust line within the spacing 17. The solution within casing 12 is thereby heated giving rise to ammonia vapors which pass to and are condensed by condenser 22. In condenser 22 the pressure which is due only to ammonia vapor is sufficiently high to produce condensation. The condensed ammonia then trickles to the evaporator—and the process is repeated until the evaporator reaches the thermostat setting, whereupon the line to the motor 33 is opened. Simultaneously the line to the solenoid valves is opened and the valves close, trapping liquid ammonia and vapors of ammonia in the condenser. When the thermostat again indicates a demand the thermostat completes the circuit (FIGURE 7), the motor will automatically be energized and solenoid valves 23, 23a opened.

It is to be noted that the high velocity of by-passed exhaust gases passing through venturi 39 to extremity 4 of the exhaust line tends to withdraw any gases remaining in the generator, thereby assisting in maintaining the atmosphere of the generator free of corrosive effects. Further, the gases themselves are constrained to follow a circuitous path through the generator thereby providing good heating transmission to the gas absorption liquid in the generator.

As shown in FIGURE 6 in a preferred arrangement outside air is brought in over the condenser, coil, and absorption chamber and directed to the evaporator where it becomes cooled and is passed to the interior of the vehicle.

Forced air may be supplied by motor driven fan 41 for cooling of the coil 29 if desired. Displaced warm air passes out through the vehicle body or through any conveniently provided outlet. Suitably some portion of the air cooled by the evaporator is directed over the other cooled components. Also recirculation of a portion of the cooled air at the desire of the operator may be accomplished by utilization of any convenient baffle arrangement.

It will be understood that this invention is susceptible to modification in order to adapt it to different usages and conditions and accordingly, it is desired to comprehend such modifications within this invention as may fall within the scope of the appended claim.

What is claimed is:

In combination with a vehicle having a gas exhaust conduit, a cooling system having a gas generator, said gas exhaust conduit having a determined portion passing through said gas generator, said determined portion having perforations, a shell having perforations surrounding said determined portion, an imperforate housing surrounding said shell and an imperforate casing surrounding said housing and defining therewith a chamber for retention of a liquid having dissolved refrigerant gas therein, said gas generator having an inlet from said exhaust conduit to receive hot exhaust gases from said exhaust conduit and an outlet to said exhaust conduit, an inlet valve in said inlet, a by-pass conduit connected to said exhaust conduit on the side of said inlet valve remote from said gas generator, and a valve in said by-pass conduit.

References Cited in the file of this patent

UNITED STATES PATENTS

| | | |
|---|---|---|
| 1,693,970 | Von Platen et al. | Dec. 4, 1928 |
| 1,824,107 | Wyndham et al. | Sept. 22, 1931 |
| 1,983,056 | Teichmann | Dec. 4, 1934 |
| 2,134,188 | Haywood | Oct. 25, 1938 |
| 2,327,451 | Perrine | Aug. 24, 1943 |
| 2,384,210 | Sunday | Sept. 4, 1945 |
| 2,783,622 | Bouraassa | Mar. 5, 1957 |